US012125154B1

(12) United States Patent
Carrasco et al.

(10) Patent No.: US 12,125,154 B1
(45) Date of Patent: Oct. 22, 2024

(54) COLLABORATIVE NOTE SHARING USING EXTENDED REALITY

(71) Applicant: UIPCO, LLC, San Antonio, TX (US)

(72) Inventors: Elena Marie Carrasco, Converse, TX (US); Mark Paxman Warnick, San Antonio, TX (US); Nathan Lee Post, Rockport, TX (US); Ravi Durairaj, San Antonio, TX (US); Jeanie Graciela Lopez, San Antonio, TX (US); Will Kerns Maney, Jr., New York City, NY (US); Nolan Serrao, Plano, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 33 days.

(21) Appl. No.: 17/822,930

(22) Filed: Aug. 29, 2022

Related U.S. Application Data

(60) Provisional application No. 63/239,251, filed on Aug. 31, 2021.

(51) Int. Cl.
*G06T 19/00* (2011.01)
*G06F 3/01* (2006.01)
*G06F 3/0354* (2013.01)
*G06F 40/169* (2020.01)

(52) U.S. Cl.
CPC ............ *G06T 19/006* (2013.01); *G06F 3/017* (2013.01); *G06F 3/03545* (2013.01); *G06F 40/169* (2020.01)

(58) Field of Classification Search
CPC ..... G06T 19/006; G06F 40/169; G06F 3/017; G06F 3/03545; H04N 2201/3245
See application file for complete search history.

(56) References Cited

U.S. PATENT DOCUMENTS

| 5,784,061 | A  | * | 7/1998 | Moran | G06F 3/0481 |
| | | | | | 715/764 |
| 8,806,354 | B1 | * | 8/2014 | Hyndman | H04L 65/403 |
| | | | | | 709/204 |
| 9,398,059 | B2 | * | 7/2016 | Shepherd | H04L 12/1822 |
| 2018/0158250 | A1 | * | 6/2018 | Yamamoto | G06T 19/20 |
| 2018/0276191 | A1 | * | 9/2018 | Yamazoe | G06F 3/04845 |
| 2020/0250261 | A1 | * | 8/2020 | Kurosawa | G06F 3/0412 |

OTHER PUBLICATIONS

"Post-Post-it: A Spatial Ideation System in VR for Overcoming Limitations of Physical Post-it Notes" Lee et al. CHI EA '21: Extended Abstracts of the 2021 CHI Conference on Human Factors in Computing Systems May 2021 Article No. 300 pp. 1-7 https://doi.org/10.1145/3411763.3451786 (Year: 2021).*

* cited by examiner

*Primary Examiner* — Antonio A Caschera
(74) *Attorney, Agent, or Firm* — Plumsea Law Group, LLC

(57) ABSTRACT

A system and method facilitate interactive collaboration using an extended reality (XR) environment. The XR environment provides an electronic whiteboard to users of the XR environment. The XR environment provides an electronic notepad to the first user at a device of the first user. The XR environment receives a note of the electronic notepad from the first user, then receives an input to detach the note from the electronic notepad and to attach the note to the electronic whiteboard. Finally, the XR environment provides a view of the note on the electronic whiteboard to the second user.

13 Claims, 6 Drawing Sheets

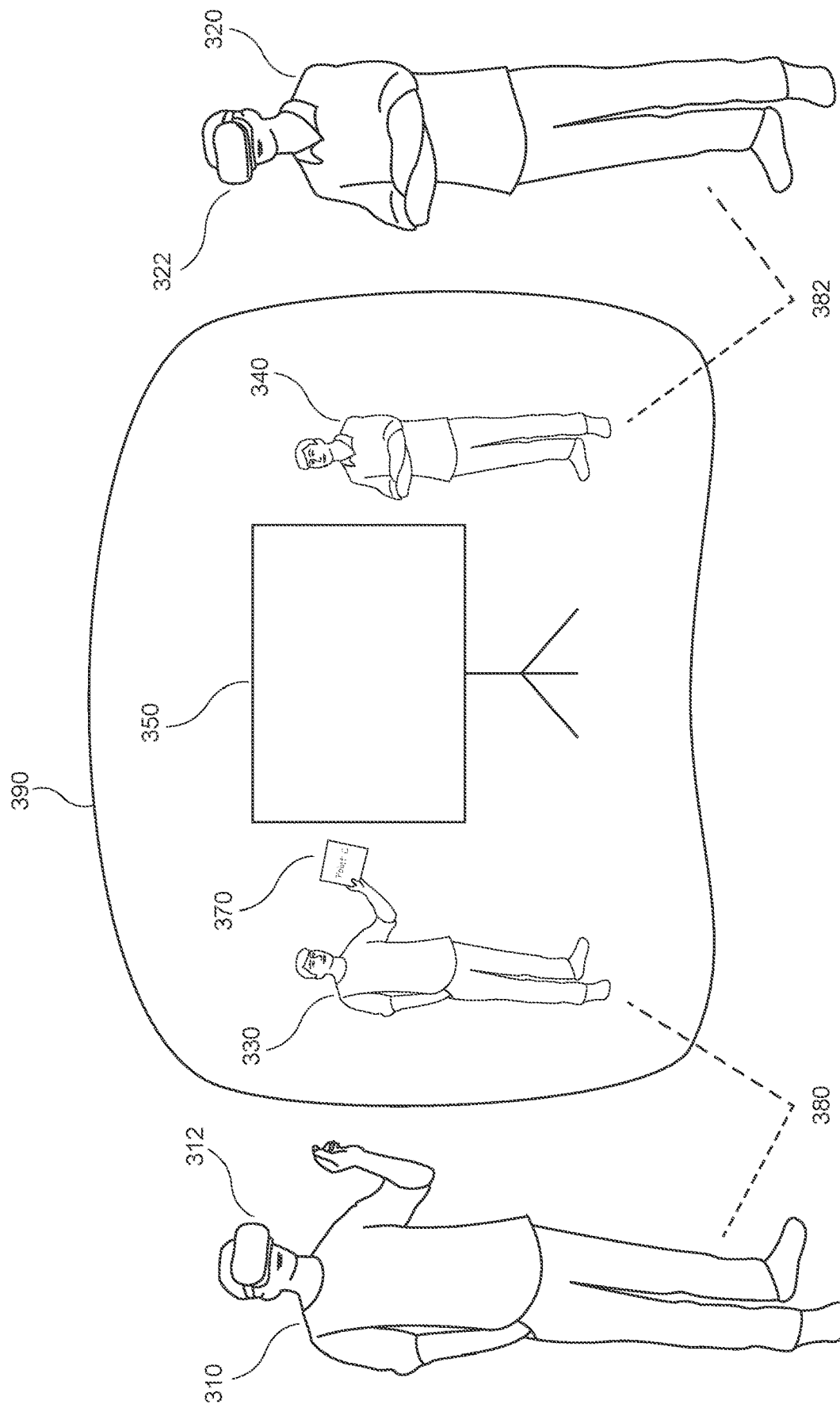

COLLABORATIVE NOTE SHARING USING EXTENDED REALITY

CROSS-REFERENCE TO RELATED APPLICATIONS

This application claims the benefit of U.S. Provisional Patent Application Ser. No. 63/239,251, filed on Aug. 31, 2021, for "Extended Reality (XR)—Phone a Friend," the entirety of which is hereby incorporated by reference.

TECHNICAL FIELD

The present disclosure generally relates to methods and systems for facilitating interactions between users in an extended reality (XR) environment, and more specifically to methods and systems that allow users of an XR environment to use electronic notes for collaboration in such an XR environment.

BACKGROUND

When collaborating during a meeting, users may encounter a number of problems. For example, users may not be present at the same location or may have limited access to physical space or materials needed to facilitate sharing information and collaborating during a meeting. Existing meeting technologies, such as audio or video meetings, allow some collaboration in an online environment, but do not sufficiently immerse the users to fully substitute for in-person meetings. For example, it may be difficult for a user to sketch a note for sharing with another user for subsequent discussion and collaboration.

There is a need in the art for a system and method that addresses the shortcomings discussed above.

SUMMARY

In one aspect, a method of facilitating interactive collaboration using an extended reality environment includes providing an electronic whiteboard to a first user and a second user in the extended reality environment. The method further includes providing an electronic notepad to the first user at a device of the first user. The method further includes receiving an electronic note on the electronic notepad from the first user at the device of the first user. The method further includes receiving an input from the first user to detach the electronic note from the electronic notepad. The method further includes receiving an input from the first user to attach the note to the electronic whiteboard. The method further includes providing a view of the electronic note on the electronic whiteboard to the second user.

In another aspect, a method of facilitating interactive collaboration using an extended reality environment includes providing an electronic whiteboard to a first user and a second user in the extended reality environment. The method further includes providing an electronic notepad to the first user at a device of the first user. The method further includes receiving an electronic note on the electronic notepad from the first user at the device of the first user. The method further includes receiving an input from the first user to move the electronic note from the electronic notepad to the electronic whiteboard. The method further includes providing a view of the electronic note on the electronic whiteboard to the second user.

In yet another aspect, a method of facilitating interactive collaboration using an extended reality environment includes providing an electronic whiteboard to a first user and a second user in the extended reality environment. The method further includes providing an electronic notepad to the first user at a device of the first user. The method further includes receiving an electronic note on the electronic notepad from the first user at the device of the first user. The method further includes receiving an input from the first user to detach the electronic note from the electronic notepad. The method further includes receiving an input from the first user to attach the electronic note to the electronic whiteboard. The method further includes providing a view of the electronic note on the electronic whiteboard to the second user. The method further includes receiving an input from the second user to annotate the electronic note attached to the electronic whiteboard. The method further includes providing an updated view of the electronic note on the electronic whiteboard to the first user and the second user.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 3 is a schematic view of a user manipulating an electronic note in an XR environment, according to an embodiment;

DESCRIPTION OF EMBODIMENTS

Figure 1:
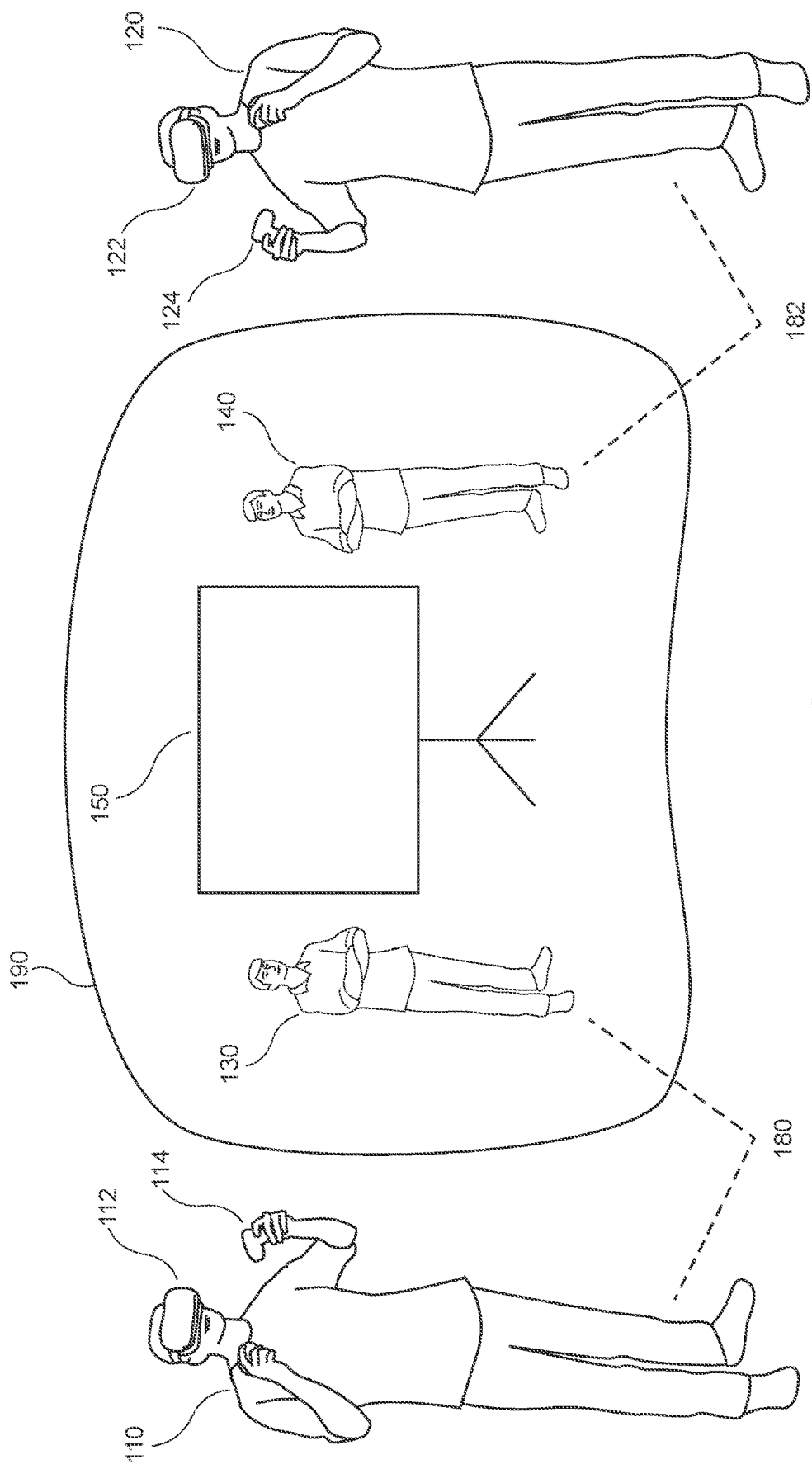
FIG. 1 is a schematic view of two users interacting in an extended reality (XR) environment, according to an embodiment.

The embodiments provide improved ways for users to interact in an extended reality (XR) environment. XR is an emerging umbrella term for immersive technologies that place a user directly into a computer-generated environment. For example, XR includes augmented reality (AR), virtual reality (VR), and mixed reality (MR) plus those that are still to be created.

All of these immersive technologies extend the reality individuals experience by either blending the virtual and real worlds or by creating a fully immersive experience.

In augmented reality, virtual information and objects are overlaid on the real world. This experience enhances the real world with digital details such as images, text, and animation. Augmented reality is accessed through AR glasses or via displays such as screens, tablets, and smartphones. In AR, the glass or displays overlay digital elements while also showing the real environment. This means users are still able to interact with their environment. Examples of AR are games that overlay digital creatures onto the real world.

In a virtual reality experience, users are fully immersed in a simulated digital environment. Users wear a VR headset or head-mounted display to get a fully immersive view of an artificial world that fools their brain into believing they are interacting directly with whatever new world the VR developers created. VR may be a valuable technology in that users can experience and interact with a simulated environment which would be difficult to create in the real world.

In mixed reality or hybrid reality, digital and real-world objects co-exist and can interact with one another in real-time. Mixed reality requires an MR headset and more processing power than VR or AR. MR allows a user to place digital objects into the room the user is standing in and gives the user the ability to spin it around or interact with the digital object in any way possible. By permitting greater interaction, MR may have greater value in various scenarios, such as where manipulating generated objects is useful.

The embodiments provide a way for users to use XR technology to improve information sharing and collaboration between remote locations by using electronic notes in an XR environment. For example, in a typical meeting scenario, when users are in a same physical location, users may collaborate by using a whiteboard, chalkboard, or bulletin board. The users may use markers or chalk to write and erase messages on the board or may affix notes to the board. By using the board in this manner, the users are able to concurrently view information on the board and may interact to write on the board and/or post messages.

However, if users are remote from one another, this type of meeting is no longer possible. Accordingly, XR technology provides for a virtual meeting with enhanced collaboration. Such a virtual meeting is also possible if the users are physically proximate to each other and may be more suitable in AR and MR environments. Even if users are physically proximate, they may have limited space or equipment to use when meeting.

For example, by using XR, the XR creates a collaboration area. If the XR technology is AR or MR, the collaboration may be based on overlaying virtual collaboration onto real-world environments, as discussed further below. By contrast, if the XR technology is VR, the collaboration may be based on totally immersing the users in a collaboration environment. Thus, XR creates a simulated collaboration space, or supplements an existing physical space by providing additional simulated equipment/facilities.

By providing users with such a simulated collaboration environment, the present embodiments allow users to more effectively collaborate in ways that would not otherwise be possible. In particular, using virtual messages facilitates collaboration by allowing users a convenient way to create electronic notes, share the contents of the notes, and collaborate based on the notes. The use of electronic notes may be more convenient and better organized than similar notes in the real world. Electronic notes may also be more secure and less prone to loss. Also, for example, the simulated collaboration environment may facilitate remote collaboration.

FIG. 1 is a schematic view of two users interacting in an extended reality (XR) environment, according to an embodiment. The term "extended reality" (or simply "XR"), as used herein refers to immersive environments where the user's environment (including visual environment but may also include auditory and kinesthetic elements) is supplemented or replaced by artificial stimuli. For example, XR includes but is not limited to AR, VR, and MR.

Referring to FIG. 1, the schematic shows two users in an XR environment 190, according to an embodiment. For example, first user 110 has an XR headset 112 and at least one XR controller 114. For example, the XR headset 112 may be a VR headset, an AR headset, or a MR headset. In FIG. 1, the XR headset 112 is illustrated as being a VR headset, though other types of headset may be used.

For example, if the XR headset 112 is a VR headset, various types of VR headset may be used, such as an all-in-one VR headset, in which the VR headset operates autonomously and generates and presents video feeds to each eye of the user. As alternatives, the VR headset may use a viewer shell and the user may insert a smartphone or similar device into the viewer shell. Here, the screen of the smartphone generates the images for each eye of the user, and the viewer shell includes optical elements to provide the images to the eyes of the user. Other alternatives are a tethered headset, where a remote computer generates the video, or a headset where a remote generates the video and transmits the video to the headset for display for a wireless link. However, these are only examples and are not to be taken as limiting.

If the XR headset 112 is an AR or MR headset, the headset may be smart glasses or another headset that provides the user with a view of his or her actual surroundings and superimposes computer-generated imagery. As an alternative, an AR or MR headset may use a portable computing device, such as a smartphone, personal digital assistant (PDA), phablet, tablet, and so on, which captures the user's environment using a rear-facing camera and superimposes computer-generated imagery onto the photographed actual environment.

The XR headset 112 may also include functionality to provide the user with audio based on the XR environment 190. For example, the XR headset 112 may include earphones, earbuds, or speakers that provide the first user 110 with immersive audio as well as immersive video. In another embodiment, the audio is provided through earphones, earbuds, or speakers that are not integrated into the XR headset 112.

The at least one XR controller 114 may serve at least two main purposes. First, the at least one XR controller 114 may allow the first user 110 to interact with and provide input to the XR environment 190. For example, FIG. 1 shows the at least one XR controller 114 as being wand-style controllers, but the at least one XR controller 114 may also be a gamepad, a haptic glove, or another handheld controller. For example, such at least one XR controller 114 may allow the XR environment 190 to track the movements of the first user 110 to present them to the second user 120 in the XR environment 190.

However, as will be discussed further below, the at least one XR controller 114 may also take the form of a stylus, and special ways of using such a stylus as the at least one XR controller 114 are discussed further below. For example, a stylus may allow a user to enter notes by drawing on the surface of a tablet, as discussed further, below. The XR environment 190 may also use motion tracking and/or touchscreen technology to gather the input of the first user 110.

Likewise, second user 120 has an XR headset 122 and at least one XR controller 124. XR headset 122 is similar to XR headset 112 and the at least one XR controller 124 is similar to the at least one XR controller 114, and hence a description of these elements is omitted for brevity. While FIG. 1 illustrates first user 110 and second user 120, embodiments are not limited to two users. For example, at least three users may be present. Alternatively, there may be only one user. If there is only one user, embodiments may still help the user organize his or her thoughts by manipulating electronic notes.

First user 110 is connected to the XR environment 190 by connection 180 and second user 120 is connected to the XR environment 190 by connection 182. Connection 180 and connection 182 may each be a wireless or a wired connection. For example, if connection 180 and connection 182 are wireless, they may use WI-FI, BLUETOOTH, 4G, or 5G to share information between the XR environment 190 and first user 110 and second user 120. Specifically, the connection 180 and connection 182 provide XR video to XR headsets 112 and 122 and optionally audio as well. Similar information may be transmitted by a wired connection, such as a HDMI and/or a USB cable, as a non-limiting example.

The XR environment 190 illustrated in FIG. 1 shows a scenario where first user 110 has a first avatar 130 and second user 120 has a second avatar 140. The first avatar 130 and the second avatar 140 provide a presence for the first user 110 and the second user 120 in the XR environment 190. The XR environment 190 also includes an electronic whiteboard 150. The electronic whiteboard 150 may be annotated and erased by the first user 110 and the second user 120, who direct the first avatar 130 and the second avatar 140 to annotate and erase the electronic whiteboard 150 to provide a shared simulated surface for use when collaborating. In FIG. 1, the XR environment 190 is generally presented as a VR environment.

However, the XR environment 190 may also be an AR or MR environment. For example, in an AR environment, the first user 110 and the second user 120 may sit in a conference room and the XR environment 190 may overlay an electronic whiteboard 150 onto an image of a real wall. The first user 110 and the second user 120 may not have avatars in an AR or an MR example, in that the XR environment 190 may directly overlay the meeting graphics and allow interaction without using avatars.

The meeting room corresponding to XR environment 190 could also be considered as being a person or participant. For example, if there were five people on the call, the meeting room could take on the role of a sixth person. Such a sixth person could be referred to by an arbitrary identifier, such as "Terry." Another attendee could ask "Terry" a question, such as "Hey Terry, what do you think?" and "Terry" could respond using Artificial Intelligence (AI) and/or Machine Learning (ML), simulating a human participant.

In addition to taking notes on a virtual whiteboard, as discussed in this disclosure, technologies such as Natural Language Processing (NLP) and ML may improve the operation of embodiments. For example, NLP may improve the ability of embodiments to parse notations written during the notetaking to recognize what users intend to write by considering the words written by users. Likewise, ML may also improve the operation of embodiments in that ML may aid processes such as handwriting recognition or voice recognition to help users interact with the XR environment 190.

Figure 2A:
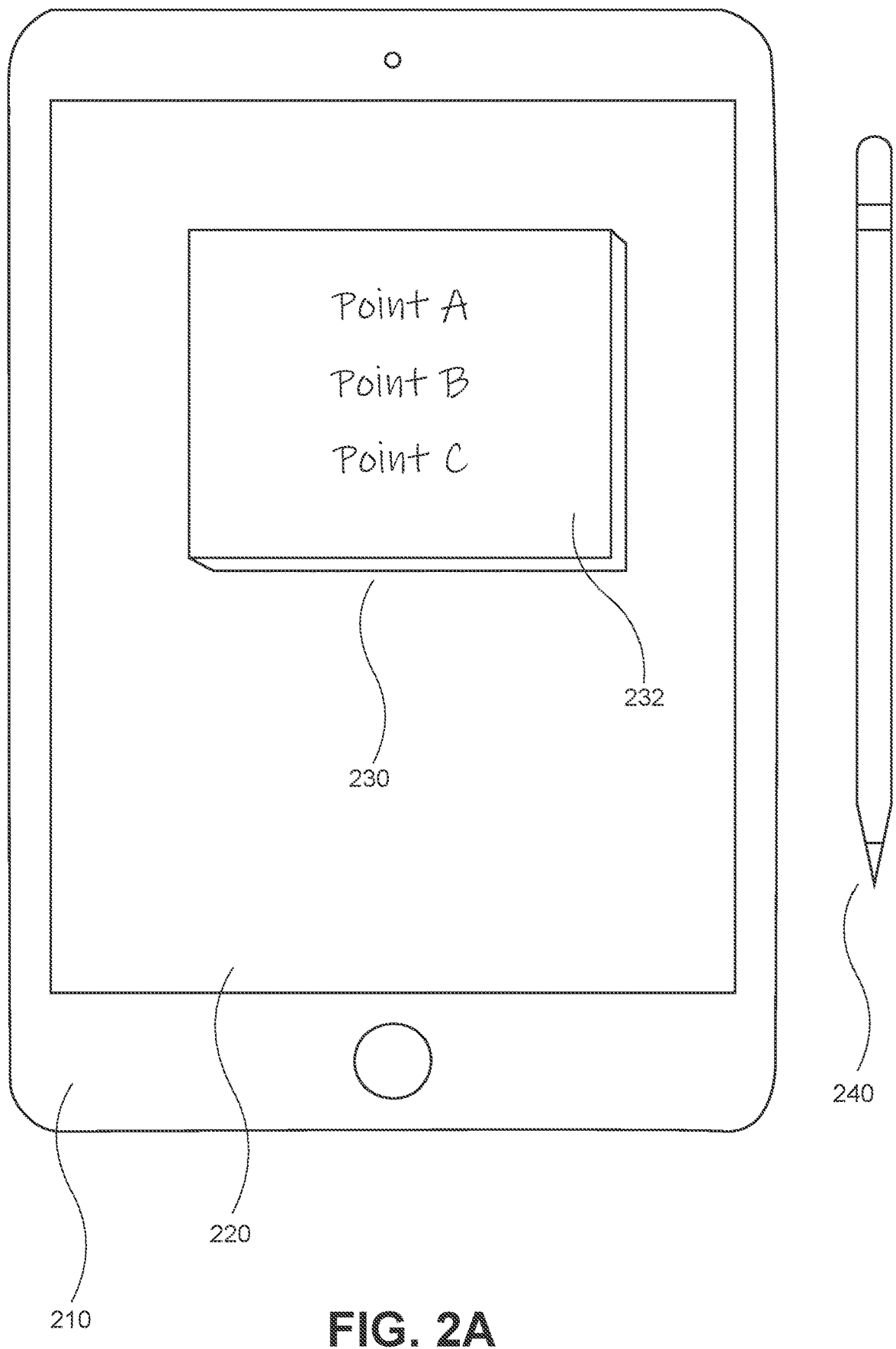
FIG. 2A is a schematic view of a tablet where a user can use a stylus to generate electronic notes, according to an embodiment.

FIG. 2A is a schematic view of a tablet where a user can use a stylus to generate electronic notes, according to an embodiment.

Referring to FIG. 2A, tablet 210 serves as an interface to allow a user to enter electronic notes for integration into the XR environment (for example, XR environment 190 of FIG. 1). However, it is to be recognized that tablet 210 is only an example device, and similar devices may serve as element 210 in FIG. 2A. For example, a smartphone, tablet, personal digital assistant (PDA), MP3 player, portable game console, touchscreen laptop or touchscreen 2-in-1 device may be used in lieu of a tablet. Because such a device generally has a bezel, tablet 210 has a screen 220 that covers a surface of table 210 not covered by a bezel. Such a screen 220 may use various touchscreen technologies, such as resistive, surface acoustic wave, capacitive, infrared grid, infrared acrylic projection, optical imaging, dispersive signal technology, and acoustic pulse recognition, as non-limiting examples.

In some examples, the tablet 210 may be coupled to a user interface module included within the tablet 210, and can include touch-sensitive components. A wide variety of image sources to provide images for display via the user interface component are known in the art including organic light-emitting diode (OLED) displays, quantum dot based light emitting diodes (QLED) displays, liquid crystal displays (LCDs), or liquid crystal on silicon (LCOS) displays, among others. The display screen may present visual elements to the user. The user interface module can be configured to control the images shown on the screen as well as interact with the touch-sensitive components of the tablet 210.

In different embodiments, the touch-sensitive components may sense at least one of a position and a movement of a finger or a stylus via capacitive sensing, resistance sensing, or a surface acoustic wave process, among other possibilities. The touch-sensitive components may be capable of sensing finger or stylus movement in a direction parallel or planar to the touchpad (screen) surface, in a direction normal to the pad surface, or both, and may also be capable of sensing a level of pressure applied to the component surface. In some embodiments, a peripheral edge of the touch-sensitive components may be formed to have a raised, indented, or roughened surface, so as to provide tactile feedback to a user when the user's finger or stylus reaches the edge, or other area, of the touch-sensitive components.

Furthermore, in different embodiments, the tablet 210 may also include an on-board computing system including one or more processors and memory. Memory may comprise a non-transitory computer readable medium. Instructions stored within memory may be executed by the one or more processors. The on-board computing system may be configured to receive and analyze data from various sensors associated with the sensor unit in the tablet 210. In different examples, the sensor unit includes a variety of sensors. The sensors can include one or more of a gyroscope, an accelerometer, a light sensor, an air pressure sensor, a microphone, a speaker, a touch-sensitive sensor, among others. In some cases, the tablet 210 may also include a navigation system equipped with a GPS receiver that can receive GPS information or other receivers capable of receiving global or local positioning information.

A communication module may allow the tablet 210 to communicate wirelessly. In different embodiments, the tablet 210 may communicate with a mobile computing device, wireless devices, and/or with networked computers, for example. In addition, the tablet 210 is illustrated as having a wireless connection; however, wired connections may also be used. For example, the communication module may include a wired serial bus such as a universal serial bus or a parallel bus, among other connections. The communication module may also include a wireless connection using Bluetooth® radio technology, communication protocols described in Institute of Electrical and Electronics Engineers (IEEE) 802.11 (including any IEEE 802.11 revisions), Cellular technology (such as Global System for Mobile (GSM), Code-Division Multiple Access (CDMA), Universal Mobile Telecommunications Service (UMTS), Evolution-Data Optimized (EV-DO), Worldwide Interoperability for Microwave Access (WiMAX), Long-Term Evolution (LTE), or 5G New Radio (NR) technologies), or Zigbee® technology, among other possibilities.

As depicted in FIG. 1, an XR headset 112 allows a first user 110 to view a displayed image or a see-through view of the scene in front of the first user 110. While FIG. 1 presents an XR headset 112 as comprising a VR headset, an AR headset, or an MR headset, other embodiments may include another wearable computing device such as a pair of smartglasses, a smart helmet, smart visor, smart faceshield, smart contact lenses, or other head-mounted display devices. The XR headset 112 system may be configured to present a combined image that includes both a displayed (virtual) image and a see-through view of the physical environment or real-world scene in front of the first user 110, where the displayed image is overlaid on the see-through view. In different operational modes, an XR headset 112 can present the displayed image so that the area of the displayed image is transparent, semitransparent or opaque. In other words, when operating in a transparent mode, the see-through view of the real-world scene is unblocked and an overlaid displayed image can be provided with low contrast. Similarly, when operating in the semitransparent mode, the see-through view of the real-world scene is partially blocked and an overlaid displayed image can be provided with higher contrast. Finally, when operating in the opaque mode, the see-through view of the real-world scene is fully blocked and an overlaid displayed image can be provided with high contrast.

As will be discussed further below, in different embodiments, some XR headsets 112 can also provide a see-through display for an augmented reality (AR) view in which real-world scenes are visible to the first user 110 but additional image information is overlaid on the real-world scenes. In one embodiment, there can be more than one area in which the display of images over the real-world view occurs. Thus, a displayed image can be viewed by the first user 110 at the same time that a view of the scene from the surrounding environment can be viewed. The displayed image (virtual projection) and the real-world view can be viewed as a combined image where the displayed virtual image is overlaid on the see-through view.

In most cases, the XR headset 112 system includes a wearable frame with lenses that have display areas and clear areas. The XR headset 112 system will also have image sources and associated optics to present image light from the image source to the display areas. When worn, the frame is supported on the user's head with frame arms ("arms"). In some embodiments, the arms can contain electronics such as a processor to drive the displays and peripheral electronics such as batteries and wireless connection(s) to other information sources (for example, through Wi-Fi, Bluetooth, cellular or other wireless technologies). One or more cameras can be included to capture images of the surrounding environment. The locations of the various components in the XR headset 112 system can vary in different embodiments. The lens can also include controllable darkening layers in the display areas configured to change the opacity behind the respective portions of the display area, thereby enabling changes in operating mode between transparent, semi-transparent and opaque in the areas where images are displayed. An XR headset 112 can provide image information to one eye of the first user 110 or both eyes of the first user 110.

A wide variety of XR headset 112 systems and image sources to provide images for display are known in the art including organic light-emitting diode (OLED) displays, quantum dot based light emitting diodes (QLED) displays, liquid crystal displays (LCDs), or liquid crystal on silicon (LCOS) displays, among others. In addition, the image sources can be microprojectors or microdisplays with associated optics to present the image light to the display areas for viewing by human eyes. In different embodiments, the optics associated with the image sources relay the image light from the image sources to the display areas, and can include refractive lenses, reflective lenses, mirrors, diffractive lenses, and/or holographic lenses or waveguides.

As noted above, in some embodiments, the XR headset 112 may be semitransparent, thereby enabling the user to view the real-world scene beyond the display, with projected images appearing superimposed or overlaid upon the background scene. Thus, the first user 110 may view a scene through a partially transparent XR headset 112 where real world objects, like a desk, a table and walls, are partially visible through the XR headset 112 which also places virtual objects within the visible scene. The virtual object(s) are anchored to the touchscreen surface. This provides the first user 110 with an augmented reality experience in which the first user 110 can see the "real world" through the display while simultaneously viewing virtual objects that appear to be fixed in real locations or on real surfaces.

Screen 220 may use various display technologies, such as those discussed above, as non-limiting examples. For example, screen 220 may use liquid crystal display (LCD), organic light-emitting diode (OLED), active-matrix OLED (AMOLED), Super AMOLED, thin-film transistor (TFT), in-plane switching (IPS), TFT-LCD, or IPS-LCD, as non-limiting examples.

Screen 220 shows an electronic notepad 230. The electronic notepad 230 is presented as a stack of notes or cards. For example, electronic note 232 shows the top card of electronic notepad 230. While the embodiment of FIG. 2A shows a stack of cards with a set arrangement, other embodiments may allow the user to rearrange the notes of electronic notepad 230, such as by reordering the notes or separating the notes into multiple piles for manipulation at tablet 210.

FIG. 2A also shows a stylus 240. The stylus 240 may be a powered stylus or a non-powered stylus. The user uses the stylus to write on electronic notes 232 of electronic notepad 230 for subsequent manipulation in the XR environment 290. However, it is to be recognized that the stylus 240 is only one way of writing on the electronic notepad 230. In other embodiments, the user may write with a finger, or a specialized pencil or crayon. Alternatively, content may be entered for the notes at the tablet 210, such as by using a virtual or physical keyboard or speech recognition. As another possibility, a user writes a note in the real world, such as on a physical notepad, and captures the note using a camera of the tablet 210 or a scanner with a wired or wireless connection to the tablet 210.

Using a tablet 210 along with a stylus 240 or another accurate writing instrument or alternative form of input may provide several advantages in the context of various embodiments. In FIG. 1, the users 110 and 120 interact in the virtual environment using the XR controllers 114 and 124. Alternatively, in other embodiments the users 110 and 120 can use hand and finger motions (or other motions) to interact in the virtual environment. Such hand and finger motions (or other motions) may be tracked in various ways, such as by using cameras and other forms of motion tracking technology. Tracking the hand and finger motions may be suitable for coarse motions, such as detaching an electronic note 232 and manipulating the electronic note 232. However, such hand and finger motions are not well suited for tracking fine motions, such as those involved in writing an electronic note 232.

Thus, using a tablet 210 and a corresponding writing instrument is a more efficient, more accurate, and more convenient way to provide for accurate tracking of the writing of a user as an electronic note 232 is created. Using a tablet 210 provides the potential for much higher resolution of movement tracking when a user is entering an electronic note 232. Using a tablet 210 may also improve latency by reducing delays as an electronic note 232 is entered. The electronic notes 232 correspond to two-dimensional surfaces. Thus, it is appropriate to use a two-dimensional surface such as the screen of a tablet 210 to enter an electronic note 232. A tablet 210 may also include a touchscreen that facilitates better input tracking and acquiring a more accurate image. Additionally, using a tablet 210 may provide tactile feedback that helps a user to write more accurately as the user enters electronic notes. Such tactile feedback may also involve features provided by stylus 240.

Also, if the XR environment is an AR or MR environment or another XR environment in which a user is able to see a screen of the tablet in the real world, such a user may be able to actually look at the screen of the tablet 210 as the user draws on the tablet. Here, the tablet 210 displays what the user draws for the user's reference. If the XR environment is a VR environment or another XR environment in which the user cannot see the real-world tablet 210 the XR environment may show a virtual version of the tablet 210 to help a user track his or her writing as the user produces a note.

As discussed above, it is also possible to use the tablet 210 in other ways to acquire information to be entered as an electronic note 232. For example, the tablet 210 may use a camera or scanner to capture an image of a physical note, or a keyboard or voice recognition. These alternative approaches are also effective ways of entering the information that may operate with greater accuracy than would be possible without using a tablet 210 or a similar device to enter the information for an electronic note 232. Whether embodiments involve use of a writing instrument or an alternative means of entering an electronic note 232, the tablet 210 may provide the functionality based on a specialized configuration that allows the tablet 210 to interact with the XR environment or a specialized mobile application or app that allows the tablet 210 to become more suitable for interaction with the XR environment.

Figure 2B:
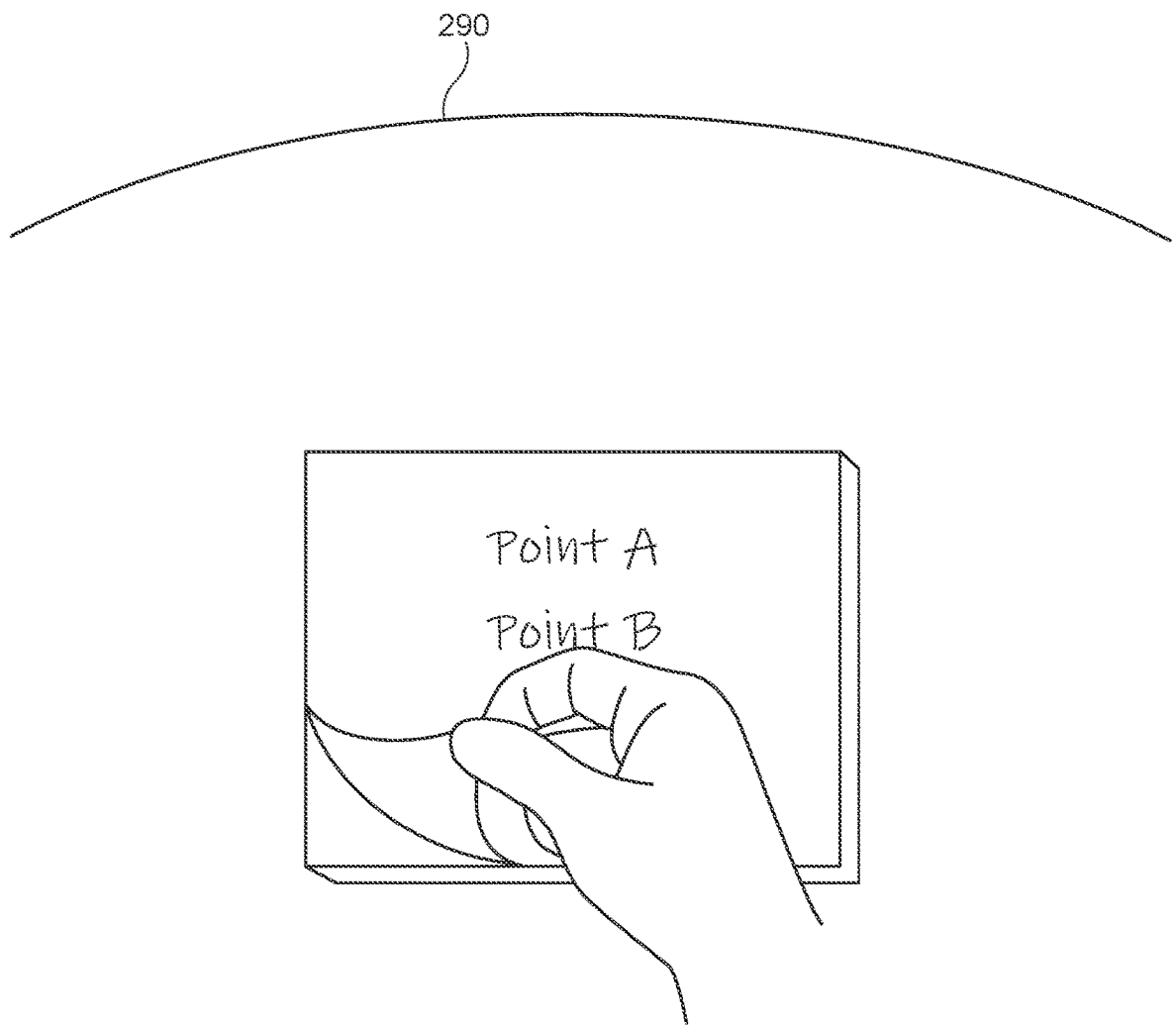
FIG. 2B is a schematic view of a virtual environment corresponding to the tablet of FIG. 2A, according to an embodiment.

FIG. 2B is a schematic view of a virtual environment corresponding to the tablet of FIG. 2A, according to an embodiment. For example, FIG. 2B shows an XR environment 290. XR environment 290 includes an electronic notepad, corresponding to electronic notepad 230 of FIG. 2A. The electronic notepad 230 shown in XR environment 290 also shows the ability to virtually tear off an electronic note 232 from the electronic notepad 230.

For example, FIG. 2B shows an XR environment 290, where a virtual hand moves as a user moves his or her actual hand. Such a virtual hand in the XR environment 290 follows the movement of the actual hand to allow the user to remove the electronic note 232 from the electronic notepad 230, such as by moving the user's hand in a tearing motion or a ripping gesture. After the note is detached, the user holds the electronic note 232 in the XR environment 290.

FIG. 3 is a schematic view of a user manipulating an electronic note in an XR environment 390, according to an embodiment. First user 310 and first XR headset 312 and second user 320 and second XR headset 322 are similar to counterpart elements of FIG. 1. First user 310 is connected to the XR environment 390 by first connection 380 and second user 320 is connected to the XR environment 390 by second connection 382.

FIG. 3 also shows an XR environment 390 with first avatar 330, second avatar 340, and electronic whiteboard 350. FIG. 3 shows a manipulation by first avatar 330 of electronic note 370, which corresponds to electronic note 232 of FIGS. 2A-2B. Electronic note 370 is actually a virtual representation of electronic note 232 in the XR environment 390 of FIG. 3. The first user 310 may show, using the first avatar 330, the electronic note 370 to the second user 320 via the second avatar 340.

As previously shown in XR environment 290 of FIG. 2B, the first user 310 causes first avatar 330 to virtually pull the electronic note 370 from electronic notepad 230. For example, the first user 310 may perform a movement or hand gesture based on his or her view of the XR environment 390 that is similar to pulling, tearing, or ripping a sheet off of the top of the electronic notepad 230. For example, such a hand gesture may be performed with respect to the electronic notepad 230.

Alternatively, the first user 310 may provide input, such as pushing a physical or virtual button, or touching a corner of the electronic notepad 230, to detach the electronic note 232 so that the first user 310 may hold the electronic note 370.

Once the electronic note 370 is removed from the notepad and held by the user, the electronic note 370 is ready for additional sharing and collaboration, as discussed in greater detail with respect to FIGS. 4-5, below.

Figure 4:
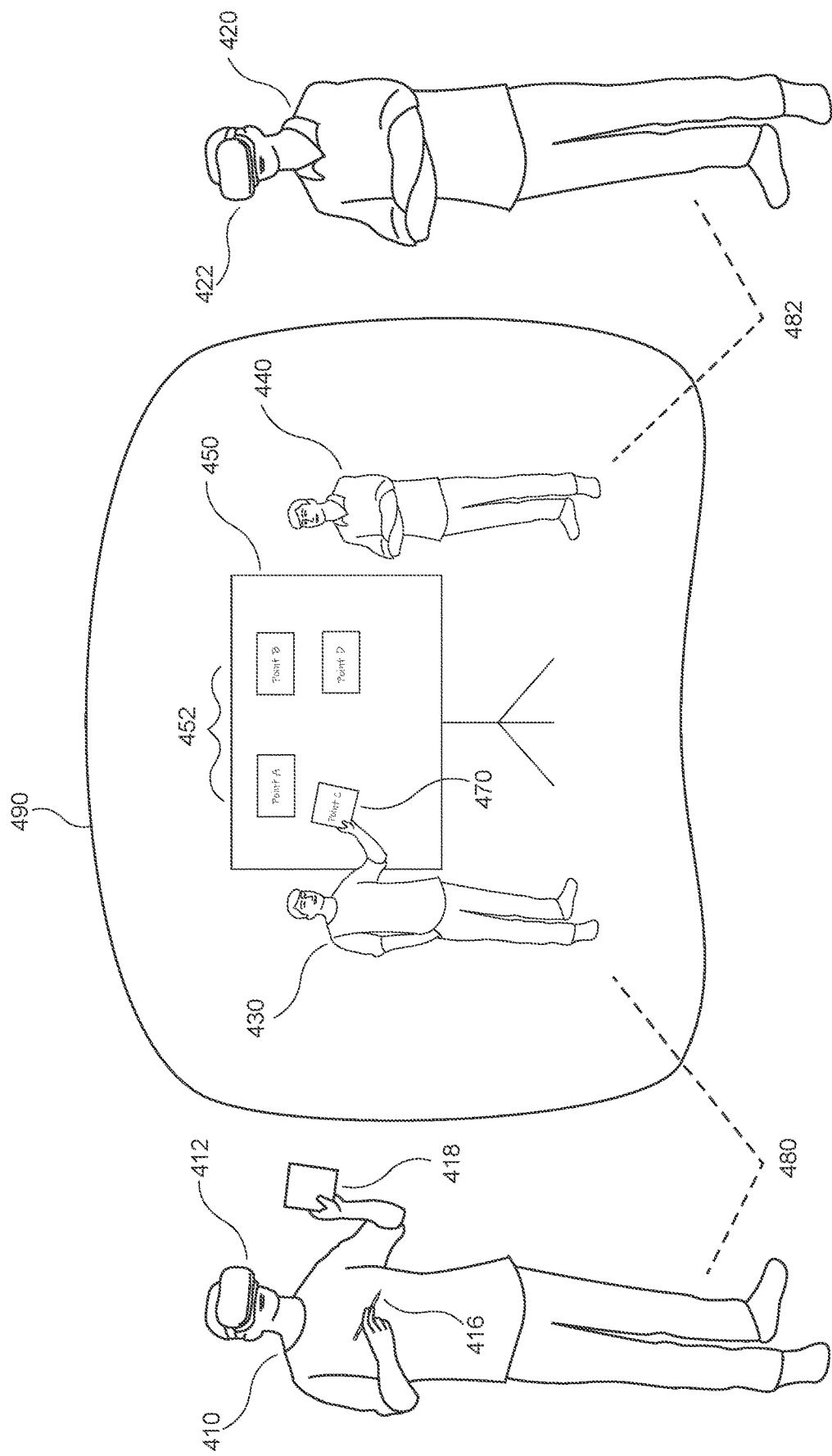
FIG. 4 is a schematic view of a of a user placing an electronic note in an XR environment on an electronic whiteboard for sharing, according to an embodiment.

FIG. 4 is a schematic view of a user placing an electronic note in an XR environment 490 on an electronic whiteboard for sharing, according to an embodiment. First user 410, first XR headset 412, first stylus 416, first tablet 418, second user 420, second XR headset 422, first avatar 430, second avatar 440, electronic whiteboard 450, first connection 480, second connection 482 are similar to counterpart elements presented above, and description is omitted for brevity.

However, FIG. 4 illustrates additional aspects of the operation of an embodiment. On electronic whiteboard 450, FIG. 4 shows electronic notes 452 posted on the electronic whiteboard 450, visible to second user 420 through second avatar 440. First user 410 directs first avatar 430 to place an electronic note 470 on the electronic whiteboard 450 for sharing and discussion. The electronic note 470 corresponds to electronic note 370 pulled from tablet avatar 360 in FIG. 3. For example, placing the electronic note 470 may involve a hand gesture. Such a hand gesture may involve moving the electronic note 470 to the electronic whiteboard 450.

Figure 5:
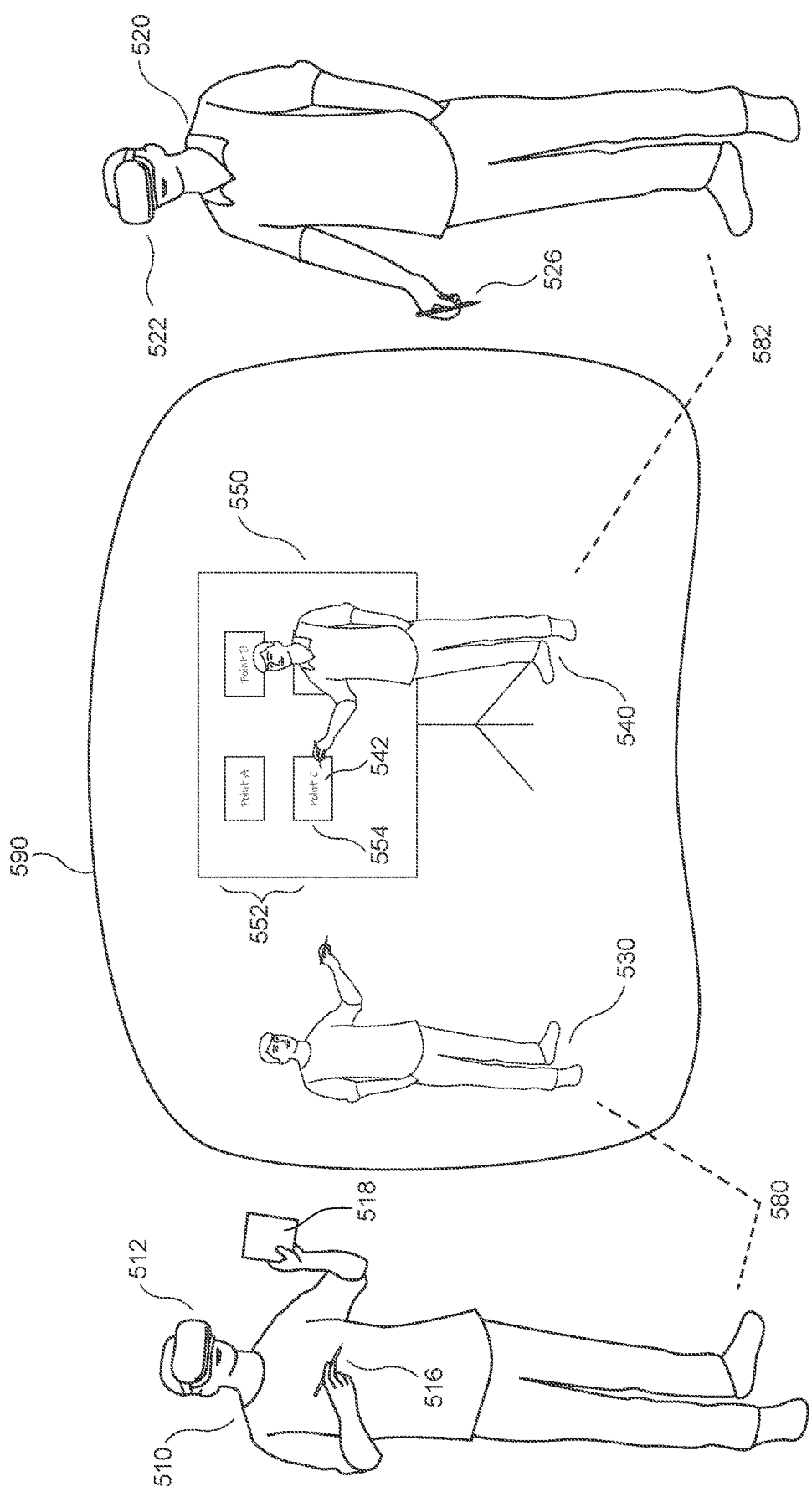
FIG. 5 is a schematic view of users sharing and editing collaboratively an electronic note in an XR environment, according to an embodiment.

FIG. 5 is a schematic view of users sharing and editing collaboratively an electronic note in an XR environment 590, according to an embodiment. First user 510, first XR headset 512, first stylus 516, first tablet 518, second user 520, second XR headset 522, first avatar 530, second avatar 540, electronic whiteboard 550, electronic notes 552, first connection 580, and second connection 582 are similar to counterpart elements presented above, and description is omitted for brevity. In FIG. 5, second user 520 has a second stylus 526, and both first user 510 and second user 520 collaborate by simultaneously looking at electronic note 554, and simultaneously editing electronic note 554 using first stylus 516 and second stylus 526.

The simultaneous editing may occur by having first user 510 and second user 520 cause first avatar 530 and second avatar 540 to manipulate the XR environment 590, such as by using first stylus 516 and second stylus 526, to edit electronic note 554. As another example, first user 510 edit electronic note 554 by using first stylus 516 along with first tablet 518, such that as first user 510 draws on first tablet 518 with first stylus 516, changes made are represented on electronic note 554. It will be recognized that second user 520 could edit electronic note 554 in a related manner. For example, annotation 542 shows how the second user 520 uses second stylus 526 to annotate electronic note 554. However, these are non-limiting examples, and other approaches to allow first user 510 and second user 520 simultaneously view and edit electronic note 554 are possible.

Embodiments may include various aspects and configurations for providing the interactive collaboration environment using extended reality discussed in the present disclosure. Embodiments may provide several methods for aspects of facilitating online collaboration. Such embodiments are presented from the perspective of an overall system that interacts with a user or with multiple users to allow the user or users to generate electronic notes. The user or users can manipulate and share these notes using an electronic whiteboard. Thus, such embodiments contemplate configurations including the XR hardware that presents the electronic whiteboard to the users. These embodiments also provide tablets (or other similar devices) through which the user or users interact with the XR environment by entering notes through the tablets.

Thus, in such embodiments, the specialized XR headset is adapted to provide a view to the user or users of the virtual environment. Such a virtual environment includes an electronic whiteboard. The XR headset allows a user to use the user's tablet to serve as a means of entering information for an electronic note on an electronic notepad. Thus, in these embodiments, the system that facilitates performing a corresponding method of facilitating interactive collaboration. The method includes both connected XR headsets as well as paired tablets (or other appropriate devices) that serve as input devices to allow a user or users to enter an electronic note.

Other embodiments are able to take advantages of the online collaboration approaches by use of a specialized XR headset alone. These embodiments do not forth specific requirements on using a tablet to provide the online collaboration approaches. In such embodiments, the same advantageous aspects of online collaboration are provided by using the specialized XR headset by itself. The functionality of the embodiments uses the XR headset to provide for interaction with a virtual whiteboard. Thus, the aspects of such embodiments focus on the ability of the XR headsets to provide a view of an electronic notepad and provide a view of electronic notes from the electronic notepad. Such embodiments provide for interaction and facilitated collaboration between users without emphasizing particular ways in which the electronic notes are generated. However, these embodiments still provide an inventive approach to facilitating such interaction using XR.

Yet other embodiments use a specialized headset, but are able to use an arbitrary tablet or another electronic device for entering notes. These embodiments also provide that users may use specialized XR headsets to provide for their ability to interact using an electronic whiteboard by sharing electronic notes. However, these embodiments may provide a mobile application or app that facilitates the interaction between the XR headsets and a tablet or another mobile device. The appropriate mobile application or app is executed using a mobile operating system. Thus, in these embodiments, the functionality for the embodiment is provided by a system that includes XR headsets. The XR headsets are adapted to allow the users of the system to interact with one another in an XR environment, as discussed above. These embodiments further provide the ability to use an arbitrary tablet or another mobile device to allow a user to enter an electronic note. Such an ability is provided by a mobile application or app that allows the arbitrary device to provide input functionality. The arbitrary device can allow a user to enter input for incorporation into the electronic notes by running the mobile application or app.

Therefore, the embodiments discussed in may provide a system that allows at least two users equipped with XR headsets to interact in an XR environment. In some embodiments, the system may also include tablets associated with the users that allow the users to interact with the tablets. For example, users may use a stylus or a finger to input electronic notes in the XR environment. In other embodiments, the system may be limited to the XR headsets themselves. In yet other the embodiments, the system include XR headsets that communicate with tablets that run a mobile application that allow the users to interact with the tablets to input electronic notes in the XR environment.

The systems provide for methods that facilitate interactive collaboration using an extended reality environment. In all of the above systems and methods, the XR headsets allow the users of the system to interact in an XR environment. The XR environment includes an electronic whiteboard. The XR environment also includes electronic notepads accessible by the users. The electronic notepads allow the users to create electronic notes, annotate the electronic notes, and move the electronic notes between the electronic notepads and the electronic whiteboard. Some embodiments further use a specialized tablet or a tablet that runs a mobile application or app as an effective approach to facilitate entry and annotation of the electronic notes.

Embodiments make it easy for users to generate electronic notes and then share such notes in a way that is both easy and simple. Such sharing is a new approach to online collaboration. Moreover, embodiments that involve use of a tablet (and possibly a stylus) provide a way to enter the electronic notes more accurately and more easily and subsequently annotate the electronic notes. Thus, embodiments provide for an inventive, effective manner of facilitating online collaboration.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. Examples of media that can be used for storage include erasable programmable read-only memory (EPROM), electrically erasable programmable read-only memories (EEPROM), solid state drives, magnetic disks or tapes, optical disks, CD ROM disks and DVD-ROM disks.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method of facilitating interactive collaboration using an extended reality environment, comprising the steps of:
    providing an electronic whiteboard to a first user and a second user in the extended reality environment;
    providing an electronic notepad to the first user at a device of the first user;
    receiving an electronic note on the electronic notepad from the first user at the device of the first user;
    receiving an input from the first user to detach the electronic note from the electronic notepad; and
    receiving an input from the first user to attach the electronic note to the electronic whiteboard to thereby share the electronic note by providing a view of the electronic note on the electronic whiteboard to the second user;
    wherein the input from the first user to detach the electronic note from the electronic notepad is a hand gesture made with respect to the electronic notepad; and
    wherein the hand gesture is similar to pulling, tearing, or ripping a sheet off of the top of the electronic notepad.

2. The method according to claim 1, wherein the extended reality environment is a virtual reality environment.

3. The method according to claim 1, wherein the electronic note is received using a stylus at the device of the first user and changes are represented on the electronic note as the first user provides input using the stylus.

4. The method according to claim 3, wherein the electronic note is received using a stylus at the device of the first user and changes are accurately represented on the electronic note as the first user provides input using the stylus by using the device of the first user to achieve a high resolution for tracking the electronic note.

5. The method according to claim 1, wherein the input from the first user to attach the electronic note to the electronic whiteboard is a hand gesture.

6. The method according to claim 5, wherein the input from the first user to attach the electronic note to the electronic notepad is a hand gesture made from the electronic notepad to the electronic whiteboard.

7. A method of facilitating interactive collaboration using an extended reality environment, comprising the steps of:
    providing an electronic whiteboard to a first user and a second user in the extended reality environment;
    providing an electronic notepad to the first user at a device of the first user;
    receiving an electronic note on the electronic notepad from the first user at the device of the first user;
    receiving an input from the first user to detach the electronic note from the electronic notepad;
    receiving an input from the first user to attach the electronic note to the electronic whiteboard to thereby share the electronic note by providing a view of the electronic note on the electronic whiteboard to the second user;
    receiving an input from the second user to annotate the electronic note attached to the electronic whiteboard; and
    providing an updated view of the electronic note on the electronic whiteboard to the first user and the second user;
    wherein the input from the first user to detach the electronic note from the electronic notepad is a hand gesture made with respect to the electronic notepad; and
    wherein the hand gesture is similar to pulling, tearing, or ripping a sheet off of the top of the electronic notepad.

8. The method according to claim 7, wherein the extended reality environment is a mixed reality environment.

9. The method according to claim 7, wherein the electronic note is received using a first stylus at the device of the first user and the input from the second user is received using a second stylus at a device of the second user.

10. The method according to claim 9, further comprising receiving an additional input from the first user to annotate the electronic note attached to the electronic whiteboard.

11. The method according to claim 10, wherein the input from the first user to annotate the electronic note attached to the electronic whiteboard and the input from the second user to annotate the electronic note attached to the electronic whiteboard are received concurrently.

12. The method according to claim 11, wherein the updated view is provided as the first user and the second user annotate the electronic note.

13. The method according to claim 7, wherein the input from the first user to move the electronic note to the electronic whiteboard is a hand gesture from the electronic notepad to the electronic whiteboard.

\* \* \* \* \*